United States Patent [19]

Sharon

[11] 3,996,668
[45] Dec. 14, 1976

[54] SHROUD WEAR MEASUREMENT

[75] Inventor: Harold Maynard Sharon, Glastonbury, Conn.

[73] Assignee: United Technologies Corporation, Hartford, Conn.

[22] Filed: Aug. 18, 1975

[21] Appl. No.: 605,563

[52] U.S. Cl. .............................. 33/170; 33/147 H; 33/189
[51] Int. Cl.² .......................................... G01B 5/00
[58] Field of Search ...... 33/170, 172 D, 178 D, 189, 33/192, 197, 147 H, 167, 169 R, 172 R, 174 G, 169 F

[56] References Cited

UNITED STATES PATENTS

| 292,463 | 1/1884 | Basset | 33/197 |
|---|---|---|---|
| 829,267 | 8/1906 | Graham | 33/189 |
| 2,303,007 | 11/1942 | Thomas | 33/178 D |
| 2,321,888 | 6/1943 | Baracskai | 33/167 |
| 2,994,963 | 8/1961 | Turner | 33/178 D |

*Primary Examiner*—Richard E. Aegerter
*Assistant Examiner*—Willis Little
*Attorney, Agent, or Firm*—Robert C. Walker

[57] ABSTRACT

Methods and apparatus for measuring wear on the contact faces of a mid-span shroud of the type extending between the adjacent blades of a gas turbine engine are disclosed. A segment of the shroud extends circumferentially from each blade into abutting relationship with a corresponding segment extending from the adjacent blade. Each segment has a contact face which is susceptible to wear at the abutting location with the adjacent segment. In one engine embodiment, the contact faces are coated with a wear resistance material to prolong the effective life of the shroud. The initial depth of the wear resistant coating or the extent of the abrasion after use are measurable in accordance within the concepts taught herein.

2 Claims, 6 Drawing Figures

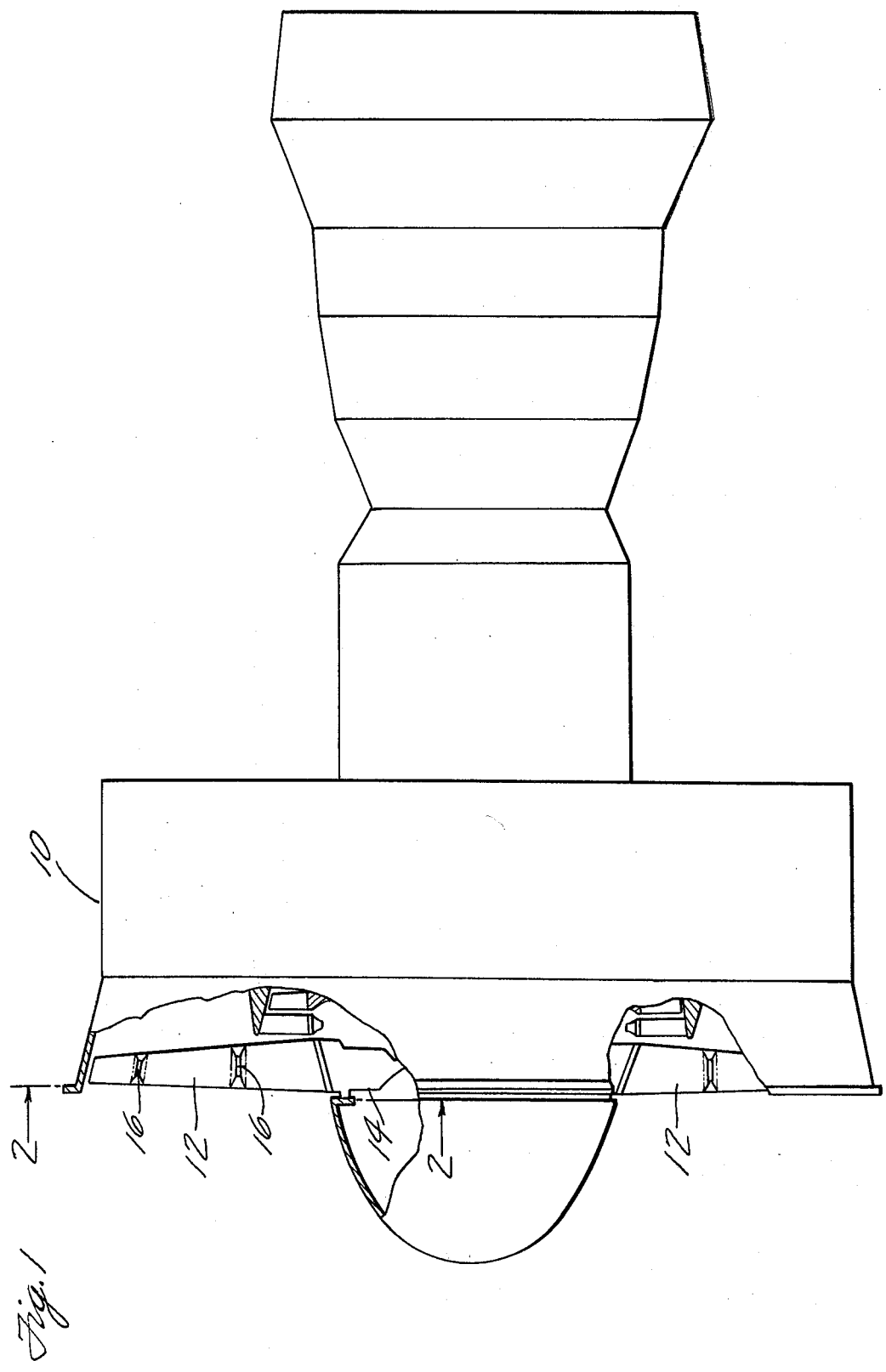

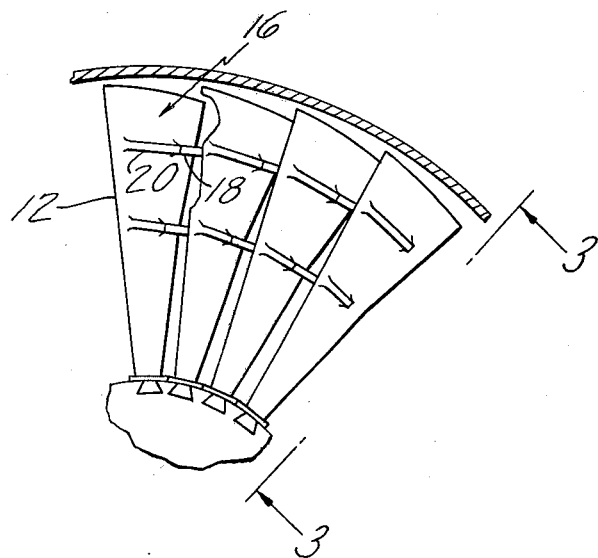
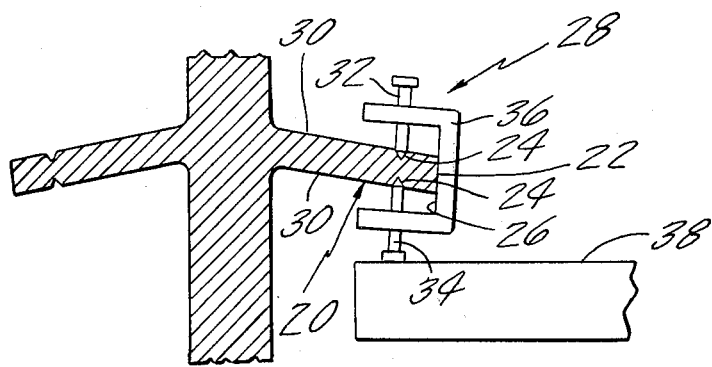
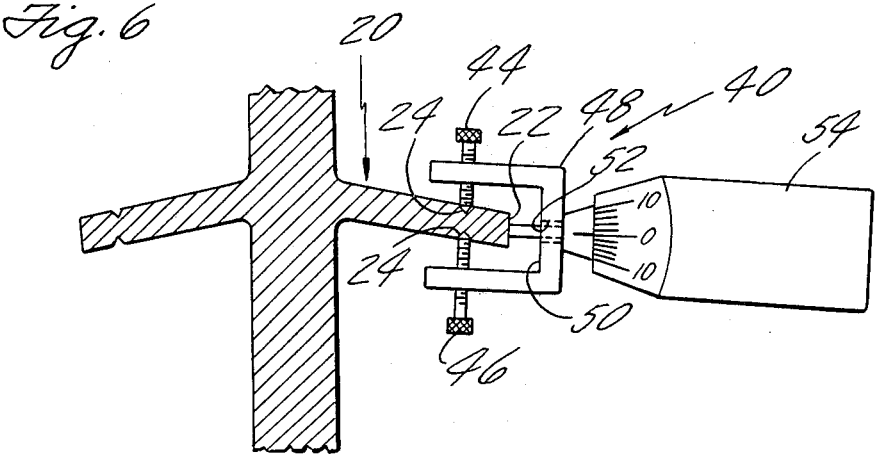

U.S. Patent  Dec. 14, 1976  Sheet 3 of 3  3,996,668
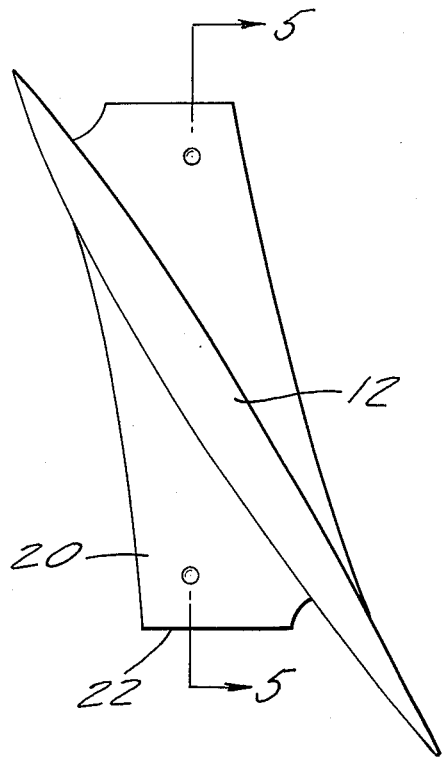
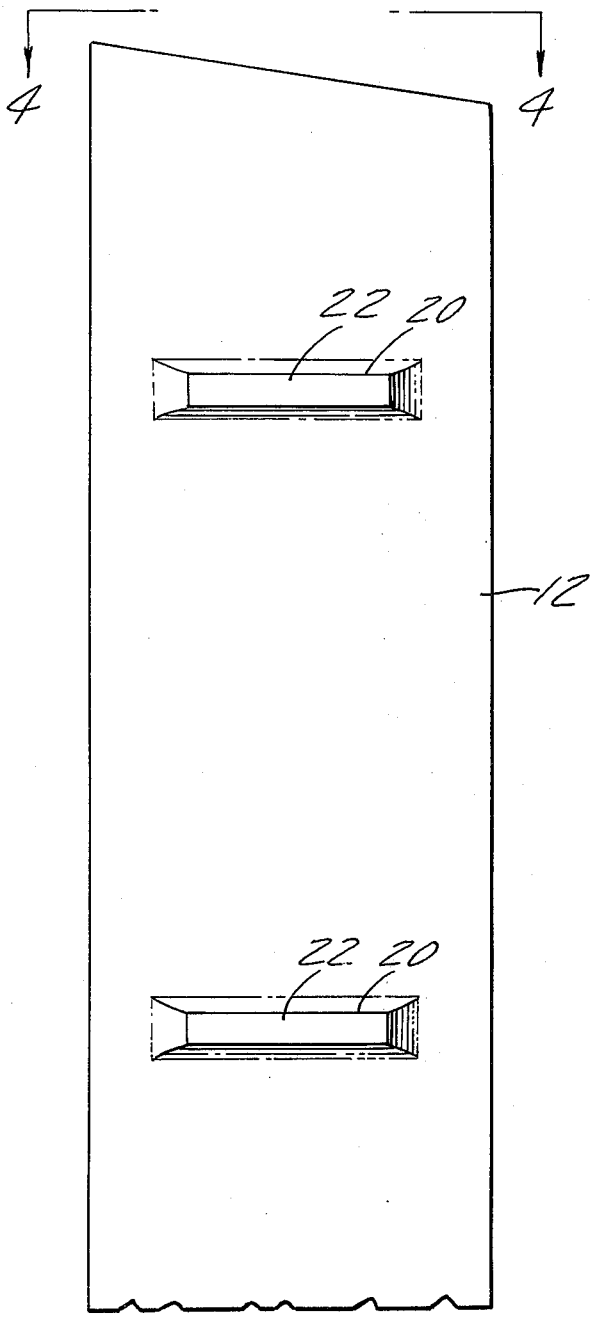

SHROUD WEAR MEASUREMENT

BACKGROUND OF THE INVENTION

1. Field of the Invention

This invention relates to the measurement of wear on an end surface and particularly to the measurement of wear on the contact faces of a mid-span shroud in a gas turbine engine.

2. Description of the Prior Art

The turbofan engine is the type of power plant most widely used on large aircraft today. In the turbofan engine as distinguished as the turbojet engine, a portion of the working medium gases is pumped axially through one or more compression stages and is exhausted directly to the atmosphere without passing through the core portion of the engine. The compression stages which exhaust directly to the atmosphere are called fan stages and are generally positioned at the forward end of the engine. The ratio of air flowing through the fan stages to the air flowing through the core portion of the engine is termed the bypass ratio. Each fan stage is sized according to the bypass ratio requirements for the particular engine. In engines designed to have high bypass ratios the span of the fan blades is of such a substantial length that one or more mid-span shrouds between the root and tip of each blade is required for support of the blades. Even in engines of relatively low bypass ratio a mid-span shroud is commonly incorporated also at a position intermediate of the root and the tip of the blade.

The mid-span shrouds circumferentially support the blades to prevent flexural vibrations as well as excessive twisting of each blade near the blade tip. Each mid-span shroud is comprised of a plurality of segments which extend circumferentially from the pressure faces of the blades into abutting relationship with a corresponding number of segments which extend from the suction faces of the adjacent blades. Each suction segment and each corresponding pressure segment are urged into intimate contact by high centrifugal and gas pressure loads on the blades during operation of the engine. Aerodynamic distrubances and vibratory excitations produce continual abrasion on the contact faces of the abutting shroud segments.

A hard facing material is commonly applied to the contact face of each opposing shroud to inhibit surface wear. Notwithstanding the presence of hardfacing material, wear does occur and material must be periodically added to the contact faces to restore the shroud to its original dimension. Accurate measurement of the extent of wear after use and of the material buildup during repair is necessary to maintain the fan blades within the tolerances consonant with acceptable engine operation.

SUMMARY OF THE INVENTION

A primary object of the present invention is to accurately determine the extent of wear on the end surface of a workpiece. Similarly, an object is to determine the thickness of a material applied to the end surface to resist abrasion or applied to restore the end surface to its original dimension.

According to the present invention a reference indentation is set by a marking tool into each of two side surfaces of a workpiece at a known distance from an end surface to be measured; the distance between the end surface and the reference indentations is subsequently measurable with a measuring tool which is engageable with the reference indentations to dispose distance measuring means in operative relationship to the end surface.

A primary feature of the present invention is the marking tool which has a pair of opposing marking pins which, in one embodiment, are operatively disposed so as to set the reference marks simultaneously into the side surfaces of the workpiece as one of the marking pins is struck. Another feature is the measuring tool which has a pair of opposing positioning pins which are engageable with the reference indentations to replicably position the tool for measurement of the distance between the indentations and the end surface. An adjustable micrometer, in one embodiment, extends from a base surface of the measuring tool into snubbed relationship with the end surface of the workpiece to be measured. In an alternate embodiment a dial indicator is positionable between the base surface of the measuring tool and the end surface of the workpiece.

A principal advantage of the present invetion is the ability of the described measuring apparatus to be repeatedly and accurately positioned with respect to the original location of the end surface for measurement of the extent of wear on the surface or for measurement of the depth of an applied coating. With respect to the contact face of a mid-span shroud in a gas turbine engine, and in departure from prior practices, the measurement system is positioned for improved accuracy independently of remote reference features which were developed for the initial manufacture of the blade. A further advantage of the system is the ability of the described apparatus to measure a contact face on a mid-span shroud which is not orthogonal to the surfaces in which the reference indentations are set.

The foregoing, and other objects, features and advantages of the present invention will become more apparent in the light of the following detailed description of the preferred embodiment thereof as shown in the accompanying drawing.

BRIEF DESCRIPTION OF THE DRAWING

FIG. 1 is a simplified, side elevation view of a gas turbine engine having a portion of the fan case cut away to show a fan blade which is enclosed therein;

FIG. 2 is a simplified, partial front elevation view of the engine shown in FIG. 1;

FIG. 3 is an enlarged view in the direction 3—3 of one of the fan blades shown in FIG. 2.

FIG. 4 is a view of a fan blade taken in the direction 4—4 as shown in FIG. 3;

FIG. 5 is a section view taken along the line 5—5 as shown in FIG. 4 and further including marking apparatus; and FIG. 6 is a section view taken along the line 5—5 as shown in FIG. 4 and further including wear measurement apparatus.

DESCRIPTION OF THE PREFERRED EMBODIMENT

A simplified side elevation view of a typical turbofan engine is shown in FIG. 1. A portion of the fan case 10 is broken away to reveal the fan blades 12 contained therein. Each fan blade extends radially outward from a rotor 14 and is radially opposed by the case 10. One or more mid-span shrouds 16 extend circumferentially about the engine between the fan blades. As shown in FIG. 2, each shroud 16 includes a pressure side segment 18 and a suction side segment 20 which meet in opposing relationship between each pair of adjacent blades. The suction side segments 20 of one of the blades 12 appear in the FIG. 3 enlarged view. Each segment 20 has a contact face 22 which, during operation of the engine, is in abutting relationship, with an opposing contact face of a pressure segment extending from the next adjacent blade. Vibratory excitations and aerodynamic disturbances move the opposing contact faces relative to each other during engine operation and, accordingly, cause surface wear on the faces 22.

Reference indentations 24 are set into each shroud segment as illustrated in FIG. 5 to initially locate each contact face 22. The indentations 24 are set into the side surfaces 30 of the shroud segment 20 at a uniform distance from base surface 26 of the marking tool 28 and from the face 22 of the shroud segment. The marking tool 28 has an upper marking pin 32 and an opposing lower marking pin 34 both of which are slideably mounted in a U-shaped frame 36. In the marking process 28 is rested upon an anvil 38 and the shroud segment 20 is inserted therein. The contact face 22 of the segment is disposed against the base surface 26 of the tool as the upper marking pin 32 is struck by a hammer to drive the marking pins simultaneously into the shroud segment 20. Although the side surfaces 30 are apparently parallel throughout the illustrations, the described marking tool is equally effective in marking non-parallel surfaces. Similarly, the marking tool is uneffected by non-perpendicularity of the contact face 22 to the side surfaces 30.

A measuring tool 40 for gaging wear on the contact face 22 of the shroud segment 20 is shown in FIG. 6. The tool 40 includes an upper positioning pin 44 and a lower positioning pin 46 which are mounted in a U-shaped frame 48 and are engageable with the reference indentations 24 to replicably position the tool with respect to the contact face 22. The tool further has a base surface 50 including a cylindrical aperture 52 therein through which an adjustable micrometer 54 is insertable as illustrated. The micrometer 54 gages the distance between the reference indentations and the face 22 to determine positional variations in the face 22 from a former condition.

Although the invention has been shown with respect to the contact face of a mid-span shroud in a gas turbine engine, the concepts are equally applicable to any similarly constructed workpiece for measuring wear on an end surface or for measuring the thickness of a coating applied to the end surface in the initial manufacture of the workpiece or as a repair procedure.

The invention has been shown and described with respect to a preferred embodiment thereof, however, it should be understood by those skilled in the art that various changes and omissions in the form and detail thereof may be made therein without departing from the spirit and the scope of the invention.

Having thus described a typical embodiment of our invention, that which we claim as new and desire to secure by Letters Patent of the United States is:

1. For a fan blade of a turbofan gas turbine engine, a method for measuring wear on the end surface of a mid-span shroud having a pair of side surfaces extending circumferentially from the blade, comprising the steps of:

positioning the internal base surface of a marking tool, having an upper marking pin and a lower marking pin which are slideably mounted in opposing relationship in a U-shaped frame, against the end surface of a mid-span shroud with the U-shaped frame bracketing at least a portion of the side surfaces of the shroud;

disposing the upper marking pin of the marking tool against one of the side surfaces of the shroud at a known distance from the end surface of the shroud;

disposing the lower marking pin of the marking tool against the other side surface of the shroud at a known distance from the end surface of the shroud;

resting the lower marking pin of the U-shaped tool against a surpport member;

striking the upper marking pin so as to cause the upper and lower marking pins to simultaneously set a pair of reference indentations in the side surfaces of the shroud at said known distance from the end surface;

subsequently positioning the internal base surface of a measuring tool, having an upper positioning pin and a lower positioning pin which are mounted in opposing relationship in a U-shaped frame at a known distance from the internal base surface, in opposing spaced relationship to the end surface of the mid-span shroud with the U-shaped frame bracketing at least a portion of the side surfaces of the shroud;

disposing the upper positioning pin against one of the side surfaces of the shroud engaging the reference indentation set therein;

disposing the lower positioning pin against the other side surface of the shroud engaging the reference indentation set therein;

operatively disposing a gaging instrument between the end surface of the shroud and the internal base surface of the measuring tool; and measuring with said gaging instrument the distance between the reference indentations of the side surfaces and the end surface so as to determine the extent to intervening wear on the end surface.

2. For a fan blade of a turbofan gas turbine engine, a method for measuring the thickness of a coating applied to the end surface of a mid-span shroud having a pair of side surfaces extending circumferentially from the blade, comprising the steps of:

positioning the internal base surface of a marking tool, having an upper marking pin and a lower marking pin which are slideably mounted in opposing relationship in a U-shaped frame, against the end surface of a mid-span shroud with the U-shaped frame bracketing at least a portion of the side surfaces of the shroud;

disposing the upper marking pin of the marking tool against one of the side surfaces of the shroud at a known distance from the end surface of the shroud;

disposing the lower marking pin of the marking tool against the other side surface of the shroud at a known distance from the end surface of the shroud;

resting the lower marking pin of the U-shaped tool against a support member;

striking the upper marking pin so as to cause the upper and lower marking pins to simultaneously set a pair of reference indentations in the side surfaces of the shroud at said known distance from the end surface;

applying a coating to the end surface;

positioning the internal base surface of a measuring tool, having an upper positioning pin and a lower positioning pin which are mounted in opposing relationship in a U-shaped frame at a known distance from the internal base surface, in opposing spaced relationship to the end surface of the midspan shroud with the U-shaped frame bracketing at least a portion of the side surfaces of the shroud;

disposing the upper positioning pin against one of the side surfaces of the shroud engaging the reference indentations set therein;

disposing the lower positioning pin against the other side surface of the shroud engaging the reference indentation set therein;

operatively disposing a gaging instrument between the end surface of the shroud and the internal base surface of the measuring tool; and measuring with said gaging instrument the distance between the reference indentations of the side surfaces and the end surface so as to determine the thickness of the coating which was applied to the end surface.

* * * * *

UNITED STATES PATENT OFFICE
CERTIFICATE OF CORRECTION

PATENT NO. : 3,996,668
DATED : December 14, 1976
INVENTOR(S) : HAROLD MAYNARD SHARON It is certified that error appears in the above-identified patent and that said Letters Patent are hereby corrected as shown below:

Column 1, line 43 "distrubances" should be --disturbances--.

Column 3, line 21, following the word "process" insert the words --the tool--.

Column 4, line 39 "to" should be --of--.

Signed and Sealed this

Eighth Day of March 1977

[SEAL]

Attest:

RUTH C. MASON
Attesting Officer

C. MARSHALL DANN
Commissioner of Patents and Trademarks